(12) United States Patent
Walsh et al.

(10) Patent No.: US 8,005,841 B1
(45) Date of Patent: Aug. 23, 2011

(54) METHODS, SYSTEMS, AND PRODUCTS FOR CLASSIFYING CONTENT SEGMENTS

(75) Inventors: Richard J. Walsh, Raleigh, NC (US); Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 69 days.

(21) Appl. No.: 11/414,021

(22) Filed: Apr. 28, 2006

(51) Int. Cl.
*G06F 7/00* (2006.01)

(52) U.S. Cl. .................. 707/739; 707/749; 707/794

(58) Field of Classification Search .......... 707/736–740
See application file for complete search history.

(56) References Cited

U.S. PATENT DOCUMENTS

| | | | |
|---|---|---|---|
| 5,109,482 A | 4/1992 | Bohrman | |
| 5,309,359 A | 5/1994 | Katz et al. | |
| 5,404,295 A | 4/1995 | Katz et al. | |
| 5,600,775 A | 2/1997 | King et al. | |
| 5,625,833 A | 4/1997 | Levine et al. | |
| 5,754,939 A | 5/1998 | Herz et al. | |
| 5,887,120 A * | 3/1999 | Wical | 706/46 |
| 6,006,241 A | 12/1999 | Purnaveja et al. | |
| 6,094,653 A * | 7/2000 | Li et al. | 707/6 |
| 6,167,441 A | 12/2000 | Himmel | |
| 6,173,287 B1 | 1/2001 | Eberman et al. | |
| 6,173,317 B1 | 1/2001 | Chaddha et al. | |
| 6,182,808 B1 | 2/2001 | Walton et al. | |
| 6,247,002 B1 | 6/2001 | Steels et al. | |
| 6,275,819 B1 | 8/2001 | Carter | |
| 6,311,194 B1 | 10/2001 | Sheth et al. | |
| 6,327,590 B1 | 12/2001 | Chidlovskii et al. | |
| 6,332,144 B1 | 12/2001 | deVries et al. | |
| 6,356,879 B2 | 3/2002 | Aggarwal et al. | |
| 6,389,409 B1 | 5/2002 | Horovitz et al. | |
| 6,453,315 B1 * | 9/2002 | Weissman et al. | 1/1 |
| 6,457,010 B1 | 9/2002 | Eldering et al. | |
| 6,460,034 B1 * | 10/2002 | Wical | 1/1 |
| 6,463,433 B1 | 10/2002 | Baclawski | |
| 6,498,795 B1 | 12/2002 | Zhang et al. | |
| 6,546,405 B2 * | 4/2003 | Gupta et al. | 715/233 |
| 6,553,367 B2 | 4/2003 | Horovitz et al. | |
| 6,560,578 B2 | 5/2003 | Eldering | |
| 6,564,263 B1 | 5/2003 | Bergman et al. | |
| 6,581,072 B1 | 6/2003 | Mathur et al. | |
| 6,610,105 B1 | 8/2003 | Martin, Jr. et al. | |
| 6,629,100 B2 | 9/2003 | Morris et al. | |
| 6,675,159 B1 | 1/2004 | Lin et al. | |
| 6,701,362 B1 | 3/2004 | Subramonian et al. | |
| 6,725,259 B1 | 4/2004 | Bharat | |
| 6,738,764 B2 | 5/2004 | Mao et al. | |
| 6,744,922 B1 * | 6/2004 | Walker | 382/190 |
| 6,772,160 B2 | 8/2004 | Cho et al. | |
| 6,889,383 B1 | 5/2005 | Jarman | |
| 6,898,799 B1 | 5/2005 | Jarman | |

(Continued)

OTHER PUBLICATIONS

Tseng, et al., "Using MPEG-7 and MPEG-21 for personalizing video", IEEE Multimedia, Jan.-Mar. 2004, p. 42-52.*

(Continued)

*Primary Examiner* — Vei-Chung Liang (74) *Attorney, Agent, or Firm* — Withrow & Terranova, PLLC (57) ABSTRACT

Methods, systems, and products are disclosed for classifying content segments. A set of annotations is received that occur within a segment of time-varying content. Each annotation is scored to each node in an ontology. The segment is classified based on at least one of the scores.

16 Claims, 9 Drawing Sheets

U.S. PATENT DOCUMENTS

| | | | |
|---|---|---|---|
| 6,917,944 B1 | 7/2005 | Prasad et al. | |
| 6,970,840 B1 | 11/2005 | Yu et al. | |
| 7,028,024 B1* | 4/2006 | Kommers et al. | 707/718 |
| 7,054,900 B1 | 5/2006 | Goldston | |
| 7,143,353 B2 | 11/2006 | McGee et al. | |
| 7,150,030 B1 | 12/2006 | Eldering et al. | |
| 7,302,429 B1 | 11/2007 | Wanker | |
| 7,372,991 B2 | 5/2008 | Chen et al. | |
| 7,376,635 B1* | 5/2008 | Porcari et al. | 1/1 |
| 7,526,784 B2 | 4/2009 | Jarman | |
| 7,596,549 B1* | 9/2009 | Issa et al. | 1/1 |
| 7,720,849 B2* | 5/2010 | Asano | 707/739 |
| 7,779,004 B1* | 8/2010 | Walsh et al. | 707/734 |
| 2002/0007371 A1 | 1/2002 | Bray | |
| 2002/0059290 A1 | 5/2002 | Rising, III | |
| 2002/0078090 A1* | 6/2002 | Hwang et al. | 707/513 |
| 2002/0112244 A1 | 8/2002 | Liou et al. | |
| 2003/0061028 A1* | 3/2003 | Dey et al. | 704/9 |
| 2003/0074400 A1* | 4/2003 | Brooks et al. | 709/203 |
| 2003/0093790 A1 | 5/2003 | Logan et al. | |
| 2003/0095660 A1 | 5/2003 | Lee et al. | |
| 2003/0110056 A1 | 6/2003 | Berghofer et al. | |
| 2003/0120662 A1 | 6/2003 | Vishik | |
| 2003/0135468 A1 | 7/2003 | Barbir et al. | |
| 2003/0163597 A1 | 8/2003 | Hellman et al. | |
| 2003/0179228 A1 | 9/2003 | Schreiber et al. | |
| 2003/0191776 A1 | 10/2003 | Obrador | |
| 2003/0191814 A1 | 10/2003 | Tran | |
| 2003/0204605 A1 | 10/2003 | Hudson et al. | |
| 2003/0226142 A1 | 12/2003 | Rand | |
| 2003/0237085 A1 | 12/2003 | Boston et al. | |
| 2004/0003413 A1 | 1/2004 | Boston et al. | |
| 2004/0010483 A1 | 1/2004 | Brands et al. | |
| 2004/0024720 A1 | 2/2004 | Fairweather | |
| 2004/0024739 A1* | 2/2004 | Copperman et al. | 707/1 |
| 2004/0054672 A1 | 3/2004 | Tsuchitani et al. | |
| 2004/0098754 A1 | 5/2004 | Velia et al. | |
| 2004/0101272 A1 | 5/2004 | Boston et al. | |
| 2004/0111465 A1* | 6/2004 | Chuang et al. | 709/203 |
| 2004/0111750 A1 | 6/2004 | Stuckman et al. | |
| 2004/0117367 A1* | 6/2004 | Smith et al. | 707/5 |
| 2004/0154040 A1 | 8/2004 | Ellis | |
| 2004/0170321 A1* | 9/2004 | Gong et al. | 382/173 |
| 2004/0220893 A1 | 11/2004 | Spivack et al. | |
| 2004/0221311 A1 | 11/2004 | Dow et al. | |
| 2005/0004930 A1* | 1/2005 | Hatta | 707/102 |
| 2005/0005300 A1 | 1/2005 | Putterman et al. | |
| 2005/0034107 A1 | 2/2005 | Kendall et al. | |
| 2005/0050578 A1 | 3/2005 | Ryal | |
| 2005/0060743 A1 | 3/2005 | Ohnuma et al. | |
| 2005/0076365 A1* | 4/2005 | Popov et al. | 725/46 |
| 2005/0086069 A1 | 4/2005 | Watson et al. | |
| 2005/0091279 A1 | 4/2005 | Rising, III | |
| 2005/0097451 A1 | 5/2005 | Cormack et al. | |
| 2005/0120386 A1 | 6/2005 | Stone | |
| 2005/0149510 A1 | 7/2005 | Shafrir | |
| 2005/0154701 A1 | 7/2005 | Parunak et al. | |
| 2005/0216443 A1 | 9/2005 | Morton et al. | |
| 2005/0234958 A1 | 10/2005 | Sipusic et al. | |
| 2005/0235336 A1 | 10/2005 | Ma | |
| 2005/0262539 A1 | 11/2005 | Barton et al. | |
| 2005/0289179 A1* | 12/2005 | Naphade et al. | 707/104.1 |
| 2006/0004683 A1* | 1/2006 | Talbot et al. | 706/59 |
| 2006/0004752 A1* | 1/2006 | Harel et al. | 707/6 |
| 2006/0031217 A1* | 2/2006 | Smith et al. | 707/5 |
| 2006/0047635 A1 | 3/2006 | Kraenzel et al. | |
| 2006/0059260 A1 | 3/2006 | Kelly et al. | |
| 2006/0064411 A1 | 3/2006 | Gross et al. | |
| 2006/0236220 A1 | 10/2006 | Jarman | |
| 2006/0242147 A1* | 10/2006 | Gehrking et al. | 707/7 |
| 2006/0242234 A1 | 10/2006 | Counts et al. | |
| 2006/0282856 A1 | 12/2006 | Errico et al. | |
| 2007/0244903 A1 | 10/2007 | Ratliff et al. | |
| 2009/0083435 A1 | 3/2009 | Boulter et al. | |

OTHER PUBLICATIONS

Zhu et al., "Hierarchical video content description and summarization using unified semantic and visual similarity", Multimedia Systems 9(1), Jul. 2003, p. 31-53.*

Tavanapong, Wallapak, "Shot Clustering Techniques for Story Browsing", IEEE Transactions on Multimedia, vol, 6, No. 4, Aug. 2004, p. 517-527.*

Breen, C. et al., "Image Classification Using Neural Networks and Ontologies", Proceedings of the 13th International Workshop on Database and Expert Systems Applications (DEXA'02), 2002.*

Breen, C. et al., "Image Classification Using Neural Networks and Ontologies", Proceedings of the 13th International Workshop on Database and Expert Systems Applications (DEXA'02), 2002.*

No Author, "Information Technology—Multimedia Content Description Interface—Part 6: Reference Software," (website), Jun. 25, 2003, 2 pages, http://www.iso.ch/iso/en/CatalogueDetailPage.CatalogueDetail?CSNUMBER=35364&printable=true.

Johan Pouwelse et al., "P2P-based PVR Recommendation using Friends, Taste Buddies and Superpeers," (article), Jan. 2005, 6 pages, Beyond Personalization 2005, Workshop on the Next Stage of Recommender Systems Research, San Diego, USA.

Alexander Pretschner et al., "Ontology Based Personalized Search," (article), Nov. 8-10, 1999, p. 391, Proceedings of the 11th IEEE International Conference on Tools with Artificial Intelligence.

T. Srinivasan et al., "OPSHNN: Ontology Based Personalized Searching Using Hierarchical Neural Networks Evidence Combination," (article), Sep. 2006, pp. 44-44, The Sixth IEEE International Conference on Computer and Information Technology 2006.

Ronald Schroeter et al., "FilmEd—Collaborative Video Indexing, Annotation and Discussion Tools Over Broadband Networks," (article), Jan. 5-7, 2004, pp. 346-353, In Proceedings of the 10th International Multimedia Modelling Conference, Brisbane, Australia, http://metadata.net/filmed/pub/MMM04_FilmEd.pdf.

Scott Carter et al., "Digital Graffiti: Public Annotation of Multimedia Content," (article), Apr. 24-29, 2004, 4 pages, CHI '04 extended abstracts on Human factors in computing systems, Vienna, Austria, http://www.madpickle.net/scott/pubs/lb651-carter.pdf.

Deborah L. McGuinness et al., "OWL Web Ontology Language—Overview", (article), Feb. 10, 2004, 19 pages, copyright 2004 World Wide Web Consortium (W3C), http://www.w3.org/TR/2004/REC-owl-features-20040210/.

No Author, "Welcome to Webbed Footnotes!," (website), obtained Jan. 4, 2007, 1 page, http://web.media.mit.edu/~golder/projects/webbedfootnotes/.

Bostjan Marusic et al., "Share It!—Content Transfer in Home-to-Home Networks," (article), May 12-15, 2004, pp. 669-672, IEEE Melecon 2004, Dubrovnik, Croatia.

* cited by examiner

METHODS, SYSTEMS, AND PRODUCTS FOR CLASSIFYING CONTENT SEGMENTS

BACKGROUND

This application particularly relates to classifying content using ontological relationships between annotations.

Semantic understanding of annotations is needed. Many types of content include annotations. Video content, for example, is now being offered with annotations that allow a user to further explore information related to the video. These annotations may identify events, characters, or other sequences in the video stream that may be interesting to the viewer. Even the Motion Pictures Expert Group (MPEG) has proposed a standard for describing multimedia content data that supports interpretation of annotations (or "descriptors"). Despite these known annotations, conventional efforts do not analyze the annotations over time. As the content changes over time, the annotations, too, change over time. The conventional methods and systems fail to explore and understand semantic relationships between time-varying annotations. What is needed, then, are methods, systems, and products that classify content segments based on a semantic evaluation of annotations.

SUMMARY

The problems noted above, along with other problems, may be reduced or eliminated by embodiments of the present invention using methods, systems, and products that classify content segments. This invention semantically evaluates annotations associated with content. The content is then characterized based on that semantic evaluation. Embodiments of the present invention may evaluate annotation density across time in the content. Embodiments of the present invention may also evaluate semantic relationships among the annotations. Various scores may be calculated to determine an affinity between the annotations themselves. The annotations may also be scored against ontological concepts. Embodiments of the present invention may filter, discard, or otherwise reduce the number of scores to eliminate classifications having lesser affinities. The remaining scores are then used to classify the content.

According to aspects of the present invention, a method is disclosed for classifying content segments. A set of annotations is received that occur within a segment of time-varying content. Each annotation is scored to each node in an ontology. The segment is classified based on at least one of the scores.

According to another aspect of the present invention, a system classifies content segments. A classification engine or application is stored in memory, and a processor communicates with the memory. The system receives a set of annotations that occur within a segment of time-varying content. Each annotation is scored to each node in an ontology. The segment is classified based on at least one of the scores.

In yet another aspect, a computer program product classifies content segments. The computer program product comprises a computer-readable medium storing computer-readable instructions. These instructions causes receipt of a set of annotations that occur within a segment of time-varying content. Each annotation is semantically scored to each node in an ontology. The segment is classified based on at least one of the semantic scores.

Other aspects, including systems, methods, and/or computer program products according to the present invention will be or become apparent to one with ordinary skill in the art upon review of the following drawings and detailed description. Such additional aspects, including systems, methods, and/or computer program products, are included within the scope of the present invention.

BRIEF DESCRIPTION OF THE SEVERAL VIEWS OF THE DRAWINGS

The accompanying drawing figures incorporated in and forming a part of this specification illustrate several aspects, features, principles and advantages of the present invention, and together with the Detailed Description serve to better explain the aspects, features, principles, and advantages of the invention.

DETAILED DESCRIPTION

The present invention now will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will convey the invention to those skilled in the art.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
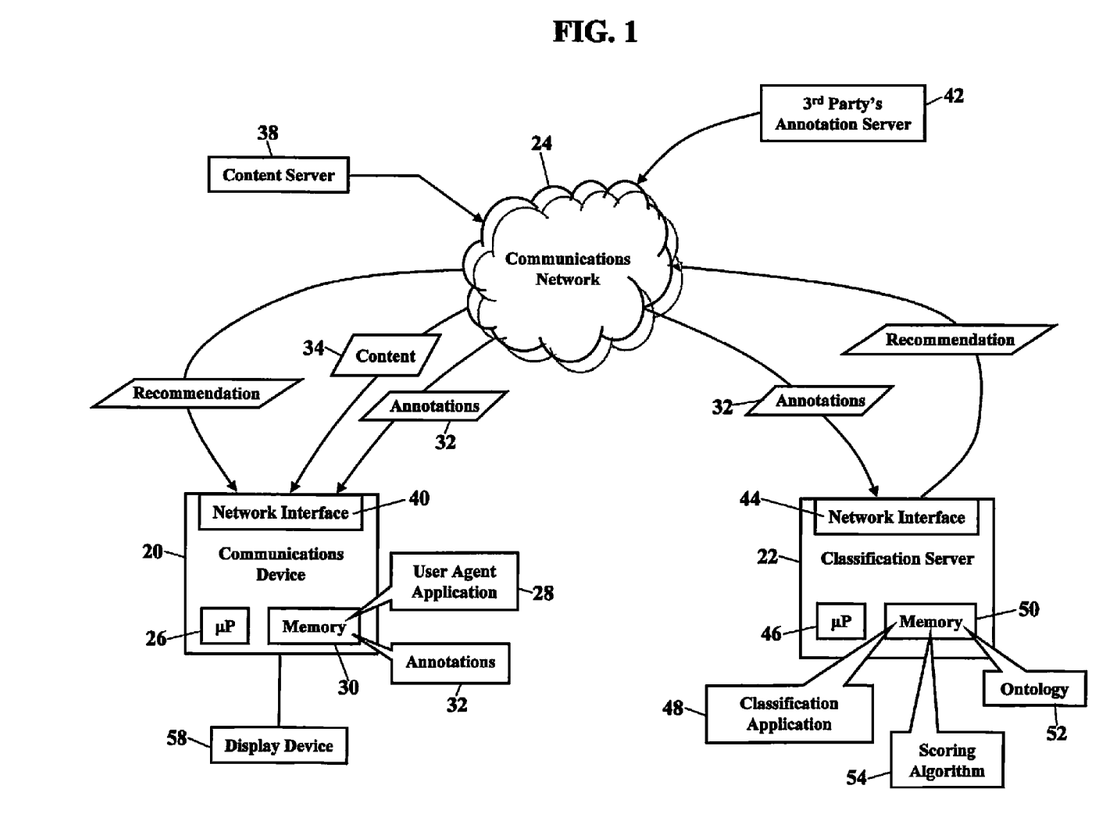
FIG. 1 is a schematic illustrating a network environment in which exemplary embodiments of the present invention may be implemented.

FIG. 1 is a schematic illustrating a network environment in which exemplary embodiments of the present invention may be implemented. A user's communications device 20 communicates with a classification server 22 via a communications network 24. Although the user's communications device 20 is generically shown, the communications device 20, as will be later explained, may be any computer, analog/digital video recorder, set top box, personal digital assistant, cordless/cellular/IP phone, or any other processor-controlled device. Whatever the user's communications device 20, the user's communications device 20 has a processor 26 (e.g., "µP"), application specific integrated circuit (ASIC), or other similar device that executes a user agent application 28 stored in memory 30. The user agent application 28 is a software engine that obtains, selects, and/or analyzes annotations 32 associated with content 34. The term "content" includes any media, whether movies, pictures, images, music, text, links, programs, and data. The content 34 may be locally or remotely obtained. The content 34 may be delineated into predefined segments, such as scenes or chapters in a movie, DVD, or stream of packets. Each segment may have its own associated start and stop time. For simplicity, though, FIG. 1 illustrates the user's communications device 20 receiving the content 34 from a content server 38 via a network interface 40 to the communications network 24.

The annotations 32 describe or augment the content 34. The annotations 32 may be any media object, such as text, graphic(s), audio, and/or video, that describes the content 34. The annotations 32 may include tags, descriptors, definitions, metadata, commentary, notes, and/or links. The annotations 32 may or may not be associated with time offsets from a start or stop time in playable media. The annotations 32 may or may not be grouped, classified, or categorized, and such systems and methods are known in the art. The annotations 32 may be streamed with or within the content 34 from the content server 38. The annotations 32 may be locally stored and retrieved from the memory 30. The annotations 32 may be received or retrieved via the communications network 24 from a third party's server 42, such as an annotation service provider. ESPN®, for example, may be a third party provider of annotations for sports programming. The annotations 32 may be fetched from any provider, such as a content provider, service provider, content producer, and/or channel producer.

Some aspects of the annotations 32, however, are known, so this disclosure will not greatly explain the known details. If, however, the reader desires more details, the reader is invited to consult the following sources, all incorporated herein by reference in their entirety: U.S. Pat. No. 5,309,359 to Katz et al. (May 3, 1994); U.S. Pat. No. 5,404,295 to Katz et al. (Apr. 4, 1005); U.S. Pat. Nos. 6,247,002 5,309,359 to Steels (Jun. 12, 2001); U.S. Pat. No. 6,564,263 to Bergman et al. (May 13, 2003); U.S. Pat. No. 6,675,159 to Lin et al. (Jan. 6, 2004); Published U.S. Patent Application 2002/0059290 to Rising, III (May 16, 2002); Published U.S. Patent Application 2004/0010483 to Brands et al. (Jan. 15, 2004); Published U.S. Patent Application 2004/0054672 to Tsuchitani et al. (Mar. 18, 2004); Published U.S. Patent Application 2005/0034107 to Kendall et al. (Feb. 10, 2005); Published U.S. Patent Application 2005/0091279 to Rising, III (Apr. 28, 2005); Published U.S. Patent Application 2005/0149510 to Shafrir (Jul. 7, 2005); Published U.S. Patent Application 2005/0216443 to Morton et al. (Sep. 29, 2005); and MPEG-7, ISO/IEC 15938-6:2003, available from the American National Standards Institute, 1819 L Street, NW, Washington D.C. 20036 USA. This disclosure also relates to the following co-pending and commonly assigned patent applications, with each incorporated herein by reference in their entirety: U.S. application Ser. No. 11/388,849, filed Mar. 24, 2006 and entitled "Collaborative Media Player Control Annotations For Recorded Media Presentation"; and U.S. application Ser. No. 11/396,746, filed Apr. 3, 2006 and entitled "Methods, Systems, and Products for Analyzing Annotations for Related Content".

However the annotations 32 are obtained, some or all of the annotations 32 are obtained by the user agent application 28. The user's communications device 20 sends one, some, or all of the annotations 32 to the classification server 22. The user's communications device 20 sends any set of annotations occurring within a segment of the time-varying content 34. The classification server 22 receives the annotations 32 via a network interface 44 to the communications network 24. The classification server 22 includes a processor 46 (e.g., "µP"), application specific integrated circuit (ASIC), or other similar device that executes a classification application 48 stored in memory 50. The classification application 48 is a software engine that analyzes the annotations 32 and classifies the associated segment of content. That is, the classification application 48 evaluates the annotations 32 and classifies the annotations 32 against one or more nodes in an ontology 52. The classification application 48 semantically scores each annotation to each node in the ontology 52 and then classifies the segment of content based on at least one of the semantic scores.

The ontology 52 is used to classify the content 34, based on the annotations 32. The ontology 52 provides a semantic relationship for the annotations 32. The ontology 52, for example, may describe nodal relationships between classifications of annotations. The classification application 48 may additionally access a scoring algorithm 54 stored in the memory 50. The classification application 48 uses the scoring algorithm 54 and the ontology 52 to generate a semantic score for each individual annotation 32. Each annotation 32 is ontologically scored against each node in the ontology 52.

As the following paragraphs explain in greater detail, the resultant score(s) is/are then used to classify the segment of content associated with the set of annotations. An exemplary embodiment of the scoring algorithm 54 that is compatible with the present invention may be found in U.S. application Ser. No. 11/359,632, filed Feb. 22, 2006 and entitled "Methods, Systems, and Products for Characterizing Target Systems", and incorporated herein by reference in its entirety.

Figure 2:
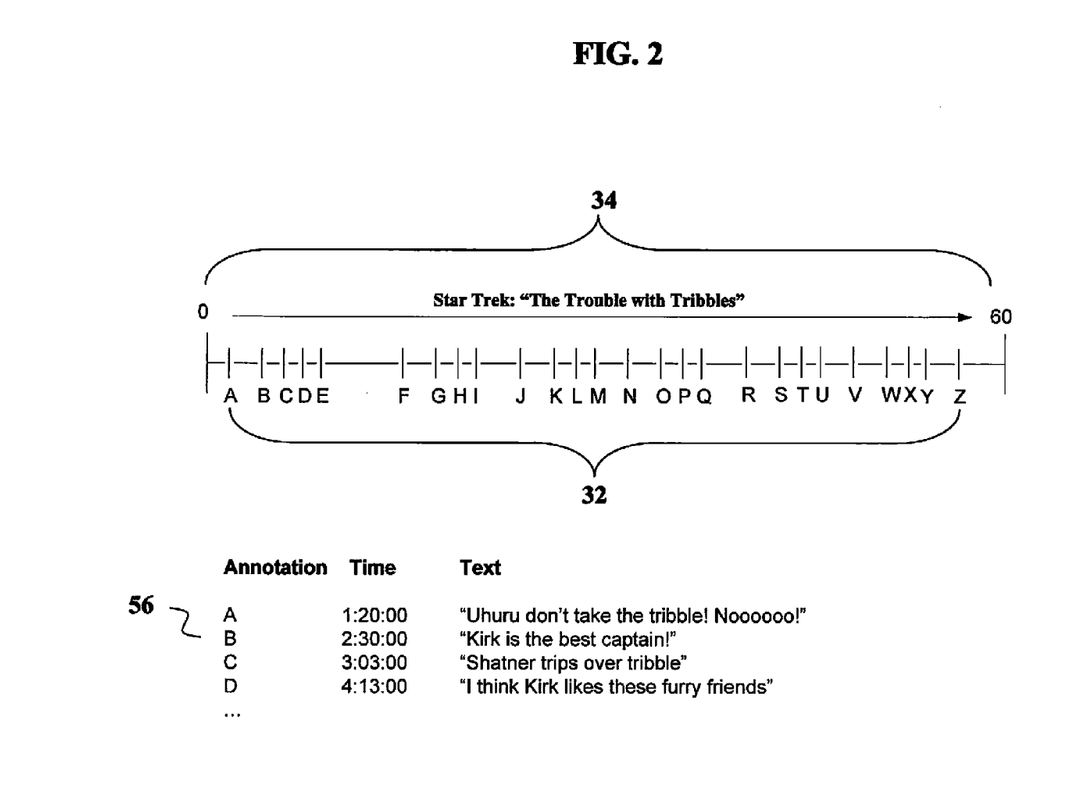
FIG. 2 is a schematic further illustrating annotations associated with the content, according to more aspects of the present invention.

FIG. 2 is a schematic further illustrating the annotations 32. Here the annotations 32 are illustrated as being associated with an episode of the television show STAR TREK®. The annotations 32 augment the content 34 with additional information and provide a valuable source of semantic information about the content 34. The classification application 48 analyzes one, some, or all of the annotations 32 to semantically understand a portion or segment of the content 34 or the content 34 across its duration. FIG. 2, for example, illustrates an annotation "B" (shown as reference numeral 56) having a time code of 2:30:00 minutes and contains the text "Kirk is the best captain!" The classification application may analyze this annotation "B" and learn that "Kirk is a captain." The classification application may also infer that "Kirk" is related to the content having the time code of 2:30:00 minutes. The classification application may thus analyze all of the annotations 32 in the episode and determine the times and segments of any other content portions or segments that are also related to "Kirk." As FIG. 2 illustrates, the classification application may discover that sequential annotations (B, C, D, E), (K, L, M, N, O, P, Q), and (W, X, Y, Z) are also associated with "Kirk." The classification server 22 thus semantically evaluates the annotations 32 to characterize the content 34 and/or segments of the content. The classification server may characterize the content 34 or the segments based on annotation density across time and/or any semantic relationships among the annotations 32.

Figure 3:
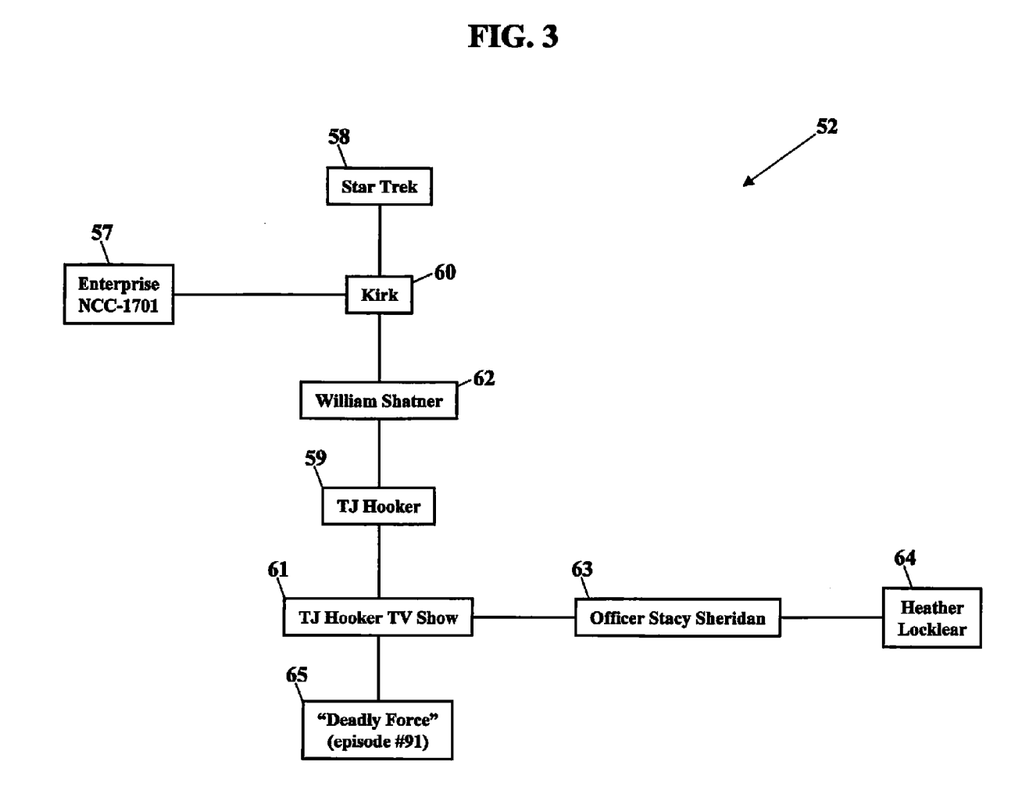
FIG. 3 is a schematic illustrating a simple, exemplary version of an ontology.

FIG. 3 is a schematic illustrating a simple, exemplary version of the ontology 52 of FIG. 1. Those of ordinary skill in the art will recognize that various applications of the present invention may utilize ontologies of any size or complexity. After the classification application 48 obtains the annotations 32 from the user agent application 28, the classification application 48 compares each annotation 32 to the ontology 52. The classification application 48 thus "semantically analyzes" each annotation 32 for any semantic relationship(s) described by the ontology 52. As those of ordinary skill in the art understand, the ontology 52 describes semantic relationships between nodal concepts. Each of nodes 57-65 may (or may not) include one or more associated predicates that describe a membership qualification for a particular node in the ontology. The ontology 52 may be described in any language or format, such as WC3's OWL Web Ontology Language, DAML+OIL, RDF, or any other language. The ontology 52 may additionally or alternatively be expressed using other structures, such as a taxonomy or as simple as a list of concepts. Those of ordinary skill in the art will appreciate known aspects of ontologies, such as those taught by the following sources, all of which are incorporated herein by reference in their entirety: W3C Recommendation, OWL Web Ontology Language—Overview, available from W3C, 32 Vassar Street, Room 32-G515, Cambridge, Mass. 02139 USA; U.S. Pat. No. 6,311,194 to Sheth et al. (Oct. 3, 2001); U.S. Pat. No. 6,498,795 to Zhang et al. (Dec. 24, 2002); U.S. Pat. No. 6,772,160 to Cho et al. (Aug. 3, 2004); Published U.S. Patent Application 2003/0120662 to Vishik (Jun. 26, 2003); Published U.S. Patent Application 2004/0220893 to Spivack et al. (Nov. 4, 2004); Published U.S. Patent Application 2005/0034107 to Kendall et al. (Feb. 10, 2005); and Published U.S. Patent Application 2005/0154701 to Parunak et al. (Jul. 14, 2005).

As FIG. 3 illustrates, the ontology 52 is a hierarchical arrangement of the nodes 57-65. Each of the nodes 57-65 expresses an idea or concept, and each of the nodes 57-65 may have a semantic relationship with another node(s). FIG. 3 illustrates simple ontological relationships between the STAR TREK® television show and the T.J. HOOKER® television show. Each of the nodes 57-65 may additionally include nodal data that further describes each node (e.g., Captain Kirk's full name, date of birth, and other information and trivia). Although not shown, each of the nodes 57-65 may also include one or more attributes that describe semantic relationships between other nodes. The "Kirk" node 60, for example, may include semantic information that relates the "William Shatner" node 62 via the attribute "actor" (again, the attributes are not shown).

Returning again to FIG. 1, the ontology 52 may be used to classify content based on the annotations 32. The classification server 22 may store the ontology 52 in the memory 50, or the classification server 22 may retrieve or access the ontology 52 via the communications network 24. The classification server 22 may even access, retrieve, or employ multiple ontologies to achieve a more comprehensive semantic analysis.

The classification server 22 compares the annotations 32 to the ontology 52. Because the ontology 52 describes semantic relationships between the nodes 57-65, the classification application 48 analyzes each annotation 32 to semantically understand the content or a portion or segment of the content. There are known concepts for comparing the annotations 32 to the ontology 52. Predicates, for example, may be associated with each ontological node. Each predicate supports information and/or program code to employ semantic scoring algorithms based on various annotation types. Each node within the ontology 52, for example, may contain keywords, natural language processing hints, audio samples, image samples, image recognition code, or any other information for evaluating an affinity or association to the node. In addition, a node may contain references to other annotations that have already been classified as being semantically associated with that node. These references to other annotations may allow the classification application to query by example techniques.

Each annotation 32 may include semantic information. As the classification server 22 receives the annotations 32, each annotation may include its associated semantic meaning. Each annotation 32, for example, may include metadata that describes semantic meaning or relationships. Each annotation 32 may additionally or alternatively include one or more references to its semantic meaning. Each reference may identify an ontological node by name, identifying number, tier or level, node number, or any other identifying information. Each reference may additionally or alternatively include a strength of an annotation's association with a node. The strength may have any value, such as a rating from zero to one hundred (e.g., 0-100). Each reference may additionally or alternatively include a Uniform Resource Locator/Indicator or other communications address to an ontology that used to analyze the associated annotation. Table I below, for example, illustrates an example reference for the annotation "A" shown in FIG. 1.

TABLE I

| Node | Strength |
|---|---|
| "Kirk" | 100 |
| "Enterprise NCC-1701" | 100 |

The classification server 22 may score each annotation 32. The classification application 48 accesses the scoring algorithm 54 stored in the memory 50. Any scoring algorithm of any simplicity or complexity may be used. The classification application 48 uses the ontology 52 and the scoring algorithm 54 to generate a semantic score for each individual annotation 32. Each annotation 32 is ontologically scored to each node in the ontology 52. Each resultant score represents an evaluation of the annotation's association or affinity to a node in the ontology 52. Each score thus represents how well the annotation matches or relates to the node. Each annotation 32 is thus associated to multiple scores—one score, for example, for each node (shown as references 57-65 in FIG. 3) in the ontology 52. Table II below, for example, illustrates a listing of nodal scores for a single annotation.

TABLE II

| Node | Score |
|---|---|
| "Kirk" | 82 |
| "Enterprise NCC-1701" | 100 |
| "Kurt Cobain" | 17 |
| "Heather Locklear" | 12 |
| "Enterprise Rent-A-Car" | 2 |

As Table II illustrates, this exemplary annotation has high and low nodal scores. The annotation has a high score for the "Kirk" and "Enterprise NCC-1701" nodes, while the remaining nodal scores are relatively lower. Hence the relatively low scores may indicate that the exemplary annotation (and thus the associated content or segment) has little or less semantic relationship to that node.

Once the nodal scores are determined, a threshold may be applied. Because each annotation 32 may have multiple scores (e.g., one score for each of the nodes 57-65 in the ontology 52, as FIG. 3 illustrates), the classification server 22 may sort, filter, or eliminate some scores. A minimum threshold score, for example, may be used to remove scores that do not satisfy the threshold. The classification application 48 may compare each nodal score to the minimum threshold score. The classification application 48 may then discard any scores that are less than the threshold minimum score. If, for example, the minimum threshold score was fifty (50), only the scores for the "Kirk" and "Enterprise NCC-1701" nodes in Table II would be retained. The classification application 48 may alternatively store only the top score (e.g., 100 for the "Enterprise NCC-1701" node) for each annotation and discard the lower scores. The classification application 48, in fact, may be configured as wished to keep or discard scores.

The classification server 22 then classifies the segment of content. After the classification application 48 scores the annotation(s) (using any of the concepts described above), the classification application 48 then uses one or more of those scores to classify the annotation(s). When the annotations 32 are classified, the segment of content is also characterized. The classification application 48 may characterize the segment by identifying one, some, or all of the annotations that occur within the segment start/stop and comparing them. The classification application 48, for example, may calculate a total score for each node in the ontology 52. As each annotation is scored to the node, the classification application 48 may sum those scores. The classification application 48, in other words, may sum each annotation's score for the same node. As the classification application 48 scores each annotation, a sum total may be maintained for each node. The higher a node's sum total score, the greater the semantic association between that node and the set or sequence of annotations. As Table III below illustrates, the classification application 48 may utilize a scoring algorithm that simply tallies or sums all of the node scores for annotations in a segment.

TABLE III

| Node | Score |
|---|---|
| "Tribble" | 2893 |
| "William Shatner" | 1832 |
| "Kirk" | 821 |
| "Uhuru" | 482 |
| "Chekov" | 392 |
| "Enterprise NCC-1701" | 238 |
| "Heather Locklear" | 82 |
| "Kurt Cobain" | 12 |
| "Enterprise Rent-A-Car" | 3 |

The classification server 22, however, may utilize other scoring algorithms when classifying segments. A more robust algorithm, for example, may account for the semantic relationships among the scored ontological nodes. The classification application 48 may calculate a score for each ontological node, based on a strength or weakness to another node or nodes. The classification application 48, in other words, may use semantic information of scored nodes to amplify or reduce a node's score. When the ontology 52 describes a semantic strength of relationships between nodes, the nodal scores may be influenced by those relationships. Suppose, for example, that the "Kirk" node and the "Enterprise NCC-1701" node (as illustrated in FIG. 3 and in Table III) have a strong relationship. The classification application 48 may then increase or amplify the score results for both nodes. If the strength between these nodes is one hundred (100), then the "Kirk" node's score may be multiplied by that strength to obtain 82,100 (e.g., 821×100=82,100). The "Enterprise NCC-1701" node would similarly have its score multiplied by the strength to obtain 23,800 (e.g., 238×100=23,800). A different algorithm may determine strength based on the semantic distance between nodes in the ontology 52. As FIG. 3 illustrates, the "Kirk" node and the "Enterprise NCC-1701" node have a distance of one node or "hop." Suppose this proximate ontological, nodal distance equates to a strength of 100. If the nodes "Kirk" and "Heather Locklear" have a nodal distance of five (5), this more distant relationship may equate to a lesser strength of twenty (20). Whatever the algorithm, the classification server 22 may retain and store one, some, or all of the calculated scores. The classification application 48 may use a minimum threshold score to only retain nodal scores greater than or equal to the threshold. The classification application 48 may additionally or alternatively filter the scores based on statistical analysis. The classification application 48, for example, may drop or discard the "Kurt Cobain" and "Enterprise Rent-a-car" nodes because their scores fall too far below an average, median, or mean score.

The classification server 22 may collapse scores. Once the nodal scores are calculated, the classification application 48 may collapse at least one lower scoring node into a higher scoring node. The classification application 48 may collapse low scoring nodes, or lower scoring nodes, into "strong" nodes, perhaps based on semantic relationships. The classification application 48, for example, may collapse the scores for "William Shatner" node, the "Kirk" node, the "Enterprise NCC-1701" node, and the "Heather Locklear" node into the "William Shatner" node. The nodal score for the "William Shatner" node is then the combined sum score of all the collapsed nodes (e.g., 1832+821+238+82=2973). The classification application 48 may additionally or alternatively utilize content metadata when collapsing nodal scores. If, for example, an ontological score for the content segment's metadata is more heavily weighted towards "Star Trek," then the classification application 48 may collapse the nodes into the "Kirk" node. However the scores are calculated, the classification server 22 stores the score(s) in the memory 50. The score(s) may be stored for future processing. The score(s) may additionally or alternatively be sent or published to a server and/or website. The score(s) may also be unicast, multicast, and/or broadcast in a collaborative environment.

Figure 4:
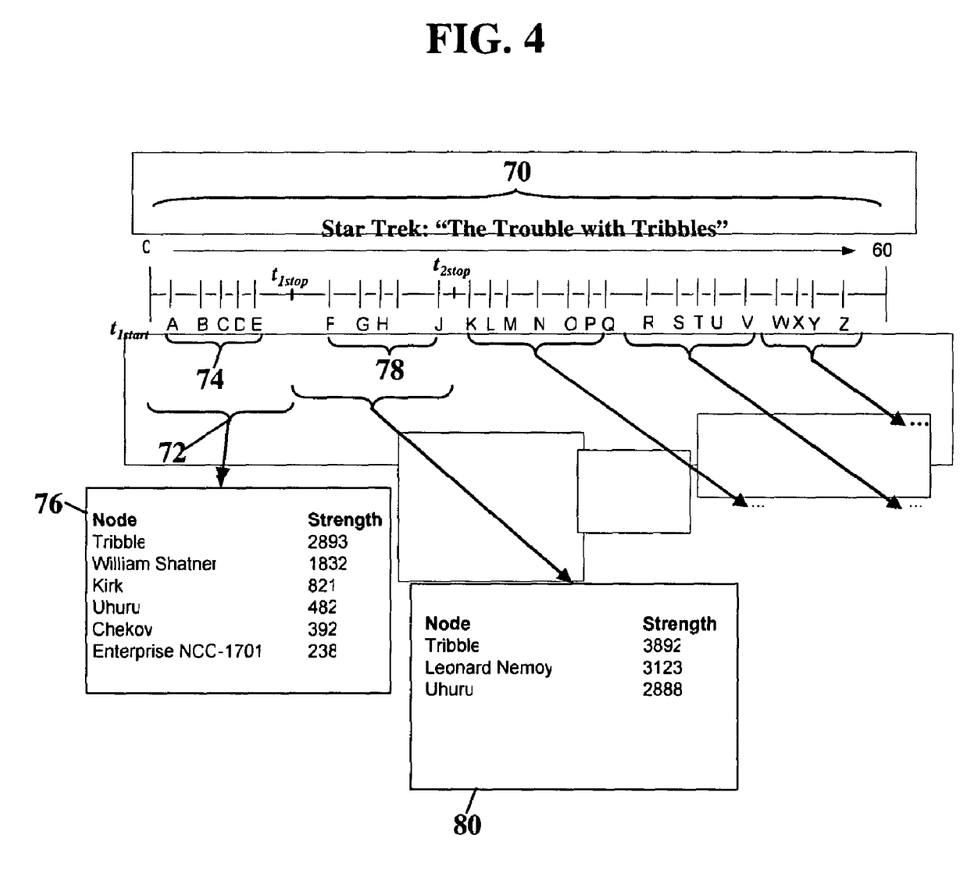
FIGS. 4 and 5 are schematics illustrating the creation of semantic segments, according to more aspects of the present invention.
Figure 5:
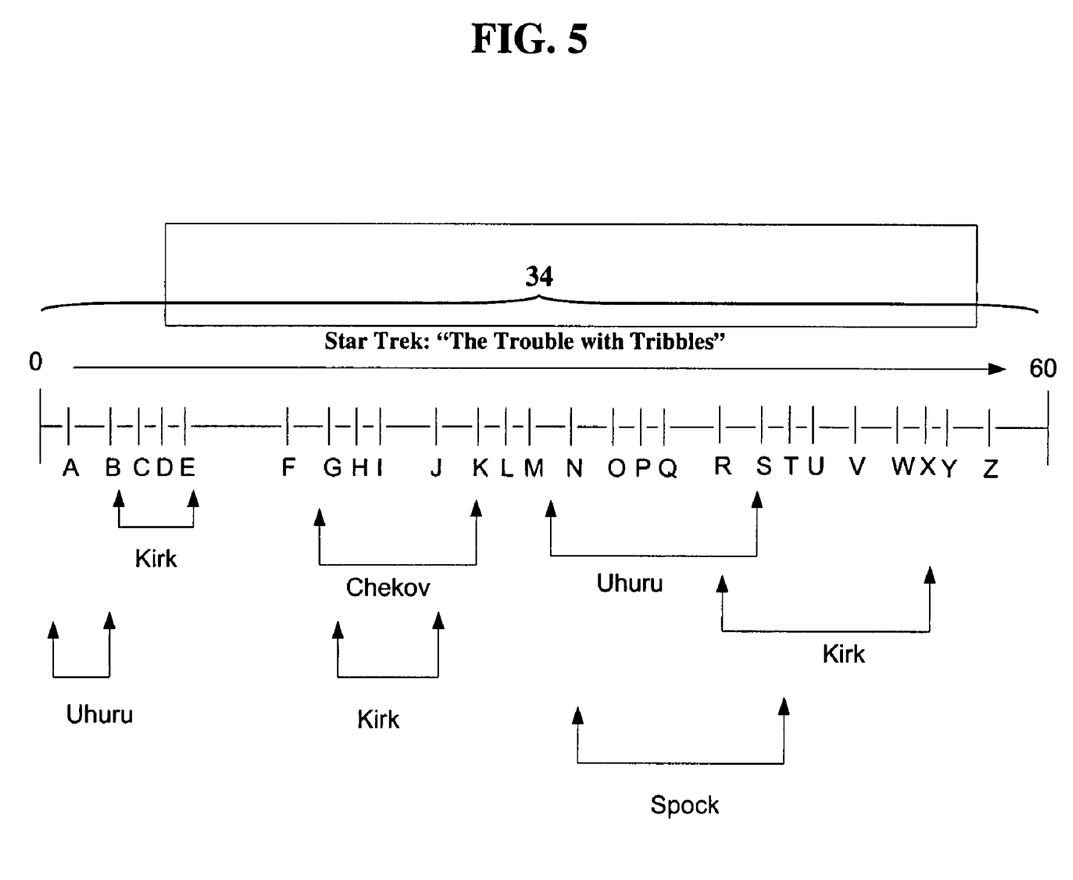

FIGS. 4 and 5 are schematics illustrating the creation of semantic segments, according to more aspects of the present invention. Here sequences of annotations are used to indicate one or more semantic segments of content. The classification server (shown as reference numeral 22 in FIG. 1) may create semantic segments based on an analysis of sequential annotations across a duration of the content. A semantic segment is a period of time within the content that possesses a cohesive or logically related set of semantic values. FIG. 4, for example, illustrates a single stream 70 of content (e.g., Star Trek's "The Trouble with Tribbles" episode), and this stream 70 of content comprises multiple segments. The segments may or may not be predefined. A first segment 72, for example, is associated with a set 74 of annotations (A, B, C, D, E), and the first segment 72 has a start time $t_{1start}=0$ and a stop time $t_{1stop}$. FIG. 4 also illustrates nodal scores 76 associated with the first segment 72 (as the above paragraphs explained). FIG. 4 likewise illustrates a second segment 78 associated with annotations (F, G, H, I, J) and having start time $t_{2start}=t_{1stop}$ and a stop time $t_{2stop}$. The nodal scores 80 associated with the second segment 78 are also shown. The classification application (shown as reference numeral 48 in FIG. 1) may use any of the concepts discussed above to reduce, filter, or discard nodal scores. Because some of the nodal scores 76 associated with the first segment 72, for example, are relatively small, the classification application may discard the lower scores. The classification application, for example, characterize the first segment 72 as "Tribble" and/or "William Shatner," thus discarding the relatively lower scoring nodes.

FIG. 5 illustrates that a set of segments may have a semantic association with a single node. The classification application (shown as reference numeral 48 in FIG. 1) may compare nodal scores for adjacent annotations. The classification application compares the semantic scores of annotation neighbors and identifies when semantic associations start and stop across time. As FIG. 5 illustrates, annotations "B," "C," "D," and "E" all have a score for the node "Kirk." Annotations "A" and "F," however, do not have nodal scores for "Kirk." The classification application may thus create a "Kirk" semantic segment that starts at annotation "B" and sequentially ends with annotation "E." The reader should note that semantic segments are not limited by predetermined segment time periods. The classification application may create segments for content in which predetermined segments are not available.

The classification application may again implement a minimum threshold score. The classification application may identify a sequence of annotations that have a nodal score for the same node. The classification application may then compare those nodal scores to the minimum threshold score. If a nodal score is equal to or exceeds the threshold, then the classification application may retain that nodal score. Even though annotations "B," "C," "D," and "E" all have a score for the node "Kirk," suppose that the nodal score for annotation "E" is relatively low when compared to the scores for annotations "B," "C," "D." A minimum threshold score may then be used to exclude annotation "E" from the semantic segment. The classification application thus creates the semantic segment (B, C, D).

A time between annotations may also be considered. As semantic segments are created, the classification application may measure or evaluate a distance between annotations. As FIG. 5 illustrates, sequential annotations (B, C, D, E) and (G, H, I, J) all have a score for the node "Kirk." The classification application may then merge or splice those separate segments into one larger semantic segment (B, C, D, E, F, G, H. I, J). When the classification application examines the time between annotations, however, the classification application may determine that annotation "G" is too distant from annotation "E." Even though annotations "E" and "G" are adjacent, the classification application may apply a threshold time and exclude any annotation(s) from the sequence that exceeds the threshold time. Because annotation "G" is too distant from annotation "E," the classification application may decline to create a single "Kirk" segment that includes annotations "B" through "J."

The minimum threshold score may also be used when creating segments. The classification application may merge or splice together segments that satisfy the minimum threshold score. The classification application may create coarse or fine grained semantic segments, depending on one or more of the minimum threshold scores. If the minimum threshold score was low enough, for example, the classification application may create an "Enterprise NCC-1701" semantic segment from annotation "B" through annotation "Z." Because each annotation (B, C, D, E, F, G, H, I, J, K, L, M, N, O, P, Q, R, S, T, U, V, W, X, Y, Z) has a score for the "Enterprise NCC-1701" node (albeit perhaps a low score), the classification application could create a single semantic segment.

Semantic relationships may also influence segments. As semantic segments are created, the classification application may consider semantic relationships between ontological nodes. Because the ontology (shown as reference numeral 52 in FIGS. 1 and 3) describes hierarchical relationships between nodal concepts, neighboring nodes may have scores that are semantically related. Again referring to FIG. 5, suppose annotation "D" has a score for the "Kirk" node and annotation "E" has a score for the "William Shatner" node (using the ontology 52 illustrated in FIG. 3). The classification application may evaluate strength or distance (as previously described) between the nodes and to determine a relationship between the "Kirk" and "William Shatner" nodes.

Figure 6:
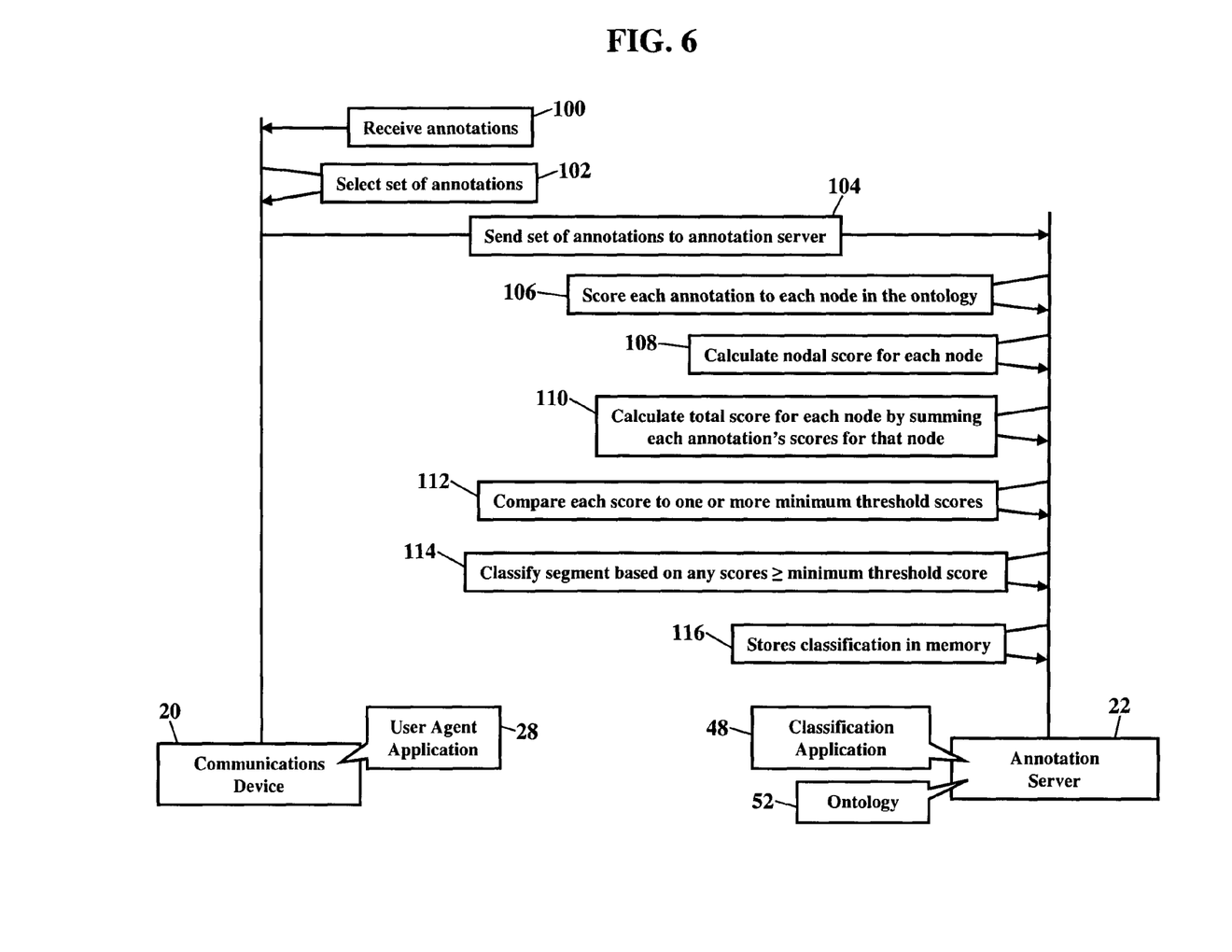
FIG. 6 is a schematic illustrating a process of classifying content segments, according to additional aspects of the present invention.

FIG. 6 is a schematic illustrating a process of classifying content segments, according to additional aspects of the present invention. The user's communications device 20 receives the annotations (Step 100). The user agent application 28 selects a set of annotations from within the annotations (Step 102) and communicates the set to the classification server 22 (Step 104). The user agent application 28 may select any sequence or combination of annotations that occur within a segment of the time-varying content. When the classification server 22 receives the set of annotations, the classification application scores each annotation to each node in the ontology 52 (Step 106). The classification application may calculate a nodal score for each node (Step 108). The classification application may also calculate a total score for each node by summing each annotation's scores for that node (Step 110). The classification application may compare each score to one or more minimum threshold scores (Step 112). The classification application may then classify the segment based on at least one of the scores that are greater than or equal to the minimum threshold score (Step 114). The classification application then stores the classification in memory (and/or a file or database) (Step 116).

The user's communications device 20 and the classification server 22 are only simply illustrated. Because the architecture and operating principles of computers, communications devise, and other processor-controlled devices are well known, the hardware and software componentry of the user's communications device 20 and the classification server 22 are not further shown and described. If, however, the reader desires more details, the reader is invited to consult the following sources, all incorporated herein by reference in their entirety: WILLIAM STALLINGS, COMPUTER ORGANIZATION AND ARCHITECTURE: DESIGNING FOR PERFORMANCE (7th Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Figure 7:
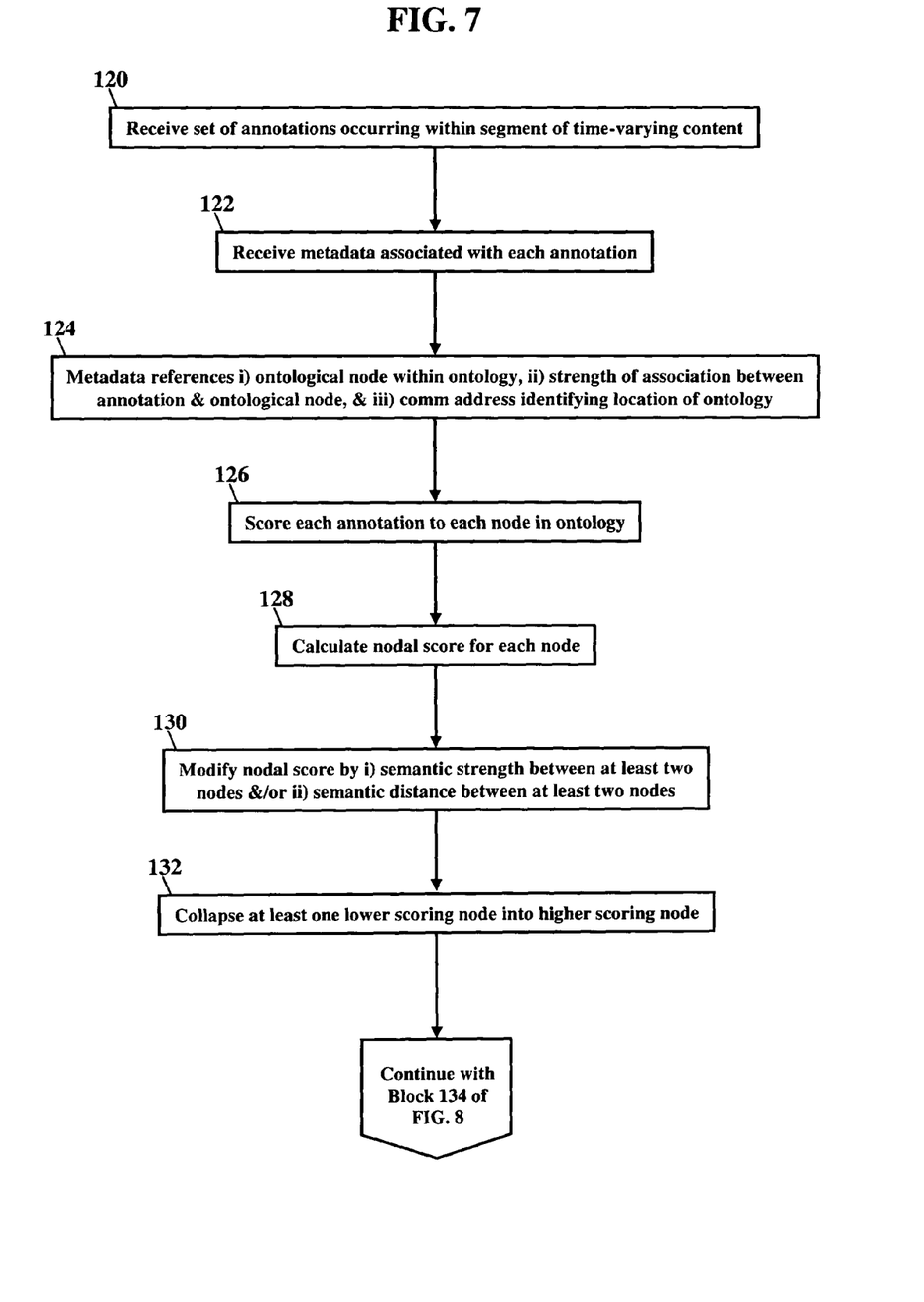
FIGS. 7 and 8 are flowcharts illustrating a method of classifying content segments, according to still more aspects of the present invention.

FIG. 7 is a flowchart illustrating a method of classifying content segments, according to still more aspects of the present invention. A set of annotations, occurring within a segment of time-varying content, are received (Block 120). Metadata associated with each annotation may also be received (Block 122). This metadata references at least one of i) an ontological node within the ontology, ii) a strength of an association between an annotation and the ontological node, and iii) a communications address identifying a location of the ontology (Block 124). Each annotation is scored to each node in an ontology (Block 126). A nodal score for each node may be calculated (Block 128). Each nodal score may be modified by i) a semantic strength between at least two nodes and/or ii) a semantic distance between at least two nodes (Block 130). At least one lower scoring node may be collapsed into a higher scoring node (Block 132).

Figure 8:
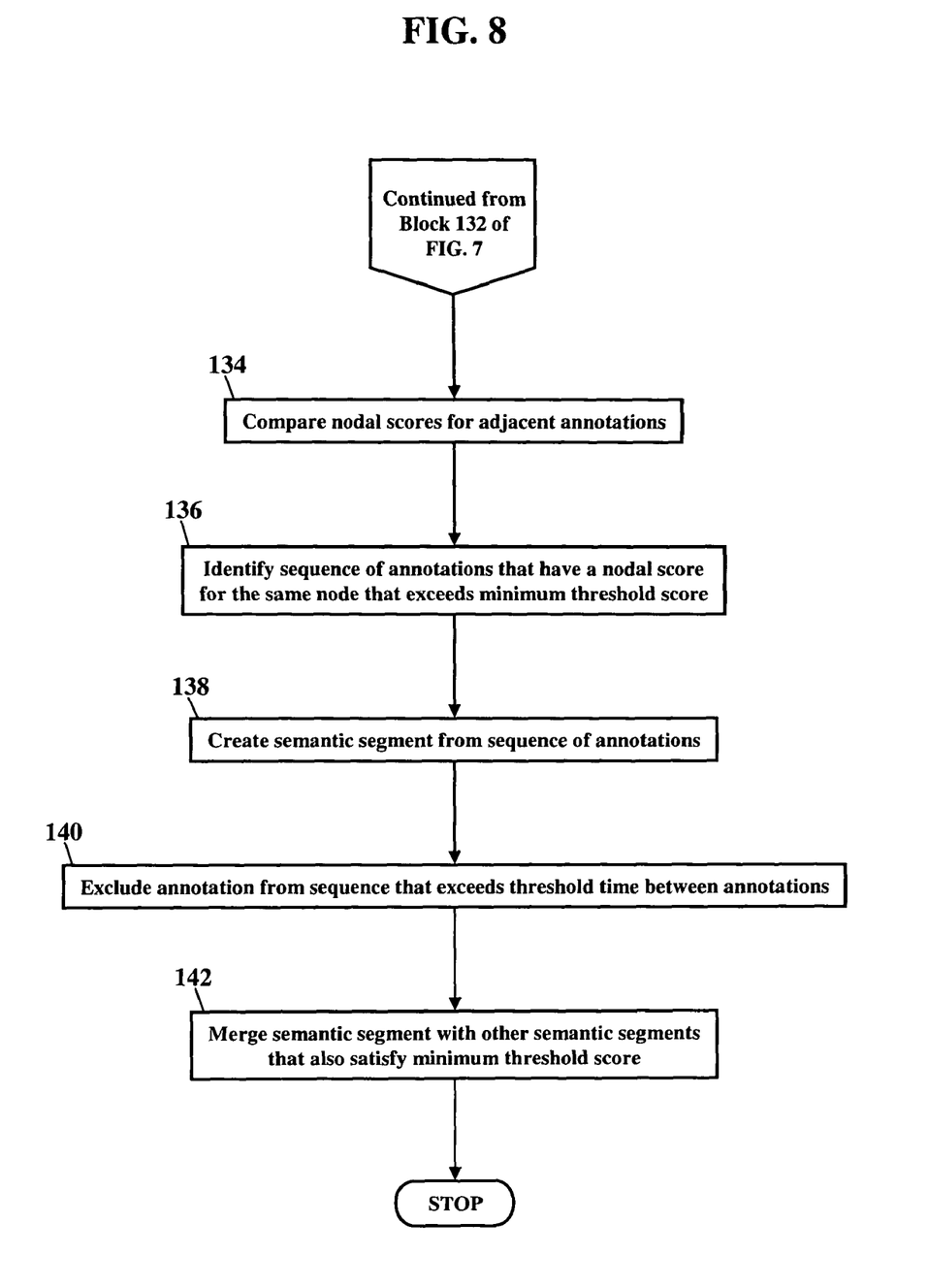

The flowchart continues with FIG. 8. Nodal scores for adjacent annotations may be compared (Block 134). A sequence of annotations may be identified that have a nodal score for the same node that exceeds a minimum threshold score (Block 136). A semantic segment may be created from a sequence of annotations (Block 138). An annotation may be excluded from the sequence that exceeds a threshold time between annotations (Block 140). The semantic segment may be merged with other semantic segments that also satisfy the minimum threshold score (Block 142).

Figure 9:
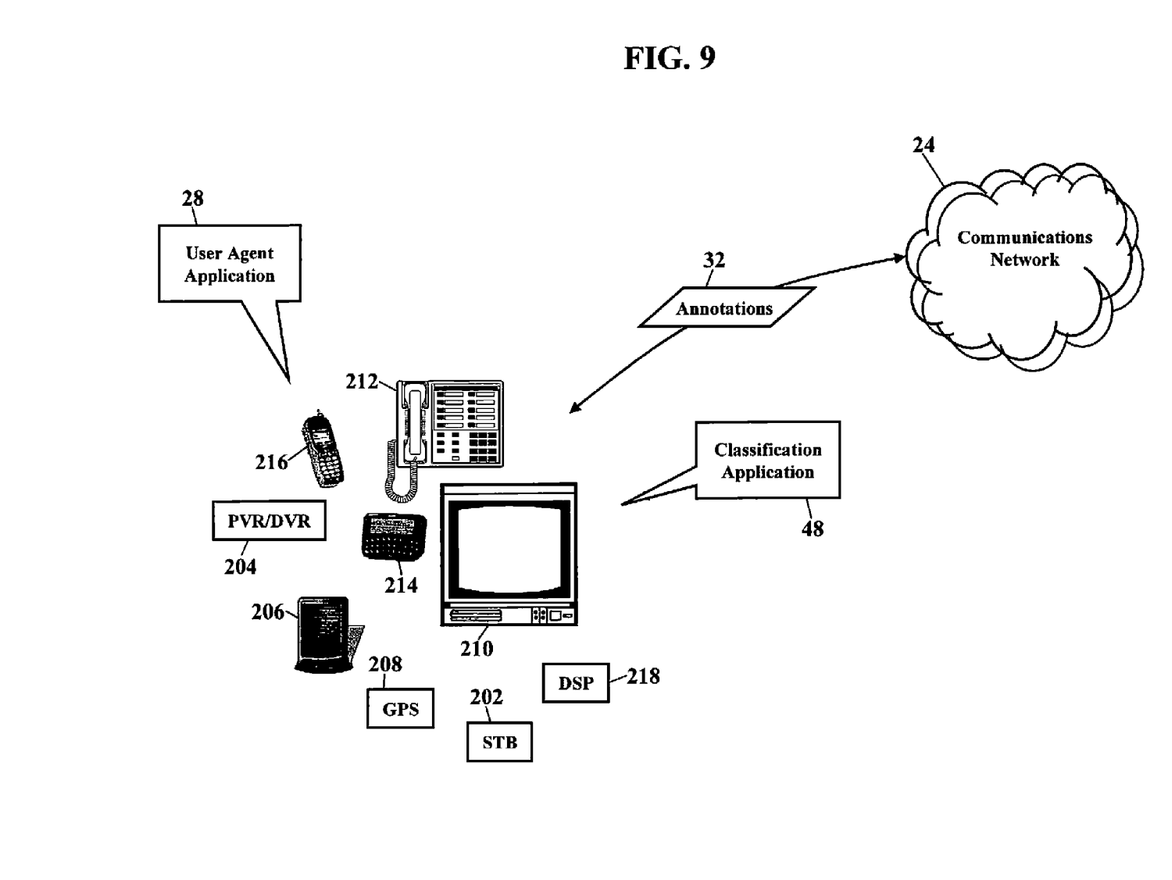
FIG. 9 depicts other possible operating environments for additional aspects of the present invention.

FIG. 9 depicts other possible operating environments for additional aspects of the present invention. FIG. 9 illustrates that the user agent application 28 and/or the classification application 48 may alternatively or additionally operate within various other communications devices. FIG. 9, for example, illustrates that the user agent application 28 and/or the classification application 48 may entirely or partially operate within a set-top box (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital signal processor (DSP) 218. The communications devices may also include watches, radios, vehicle electronics, clocks, printers, gateways, and other apparatuses and systems. Because the architecture and operating principles of the various communications devices 200 are well known, the hardware and software componentry of the various communications devices 200 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004).

The user agent application and/or the classification application may be physically embodied on or in a computer-readable medium. This computer-readable medium may include CD-ROM, DVD, tape, cassette, floppy disk, memory card, and large-capacity disk (such as IOMEGA®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the present invention to be easily disseminated. A computer program product comprises the user agent application and/or the classification application stored on the computer-readable medium. The user agent application and/or the classification application comprises computer-readable instructions/code for analyzing annotations, as hereinabove explained. The user agent application and/or the classification application may also be physically embodied on or in any addressable (e.g., HTTP, I.E.E.E. 802.11, Wireless Application Protocol (WAP), or BLUETOOTH®) wireless device capable of presenting an IP address.

While the present invention has been described with respect to various aspects, features, principles, and exemplary embodiments, those skilled and unskilled in the art will recognize the present invention is not so limited. Other aspects, variations, modifications, and alternative embodiments may be made without departing from the spirit and scope of the present invention and are considered within the scope of the concepts disclosed herein and the invention as described by the claims.

What is claimed is:

1. A device for classifying content comprising:
   memory having a classification application stored thereon; and
   a processor in communication with the memory, the processor configured to:
   receive a set of annotations occurring within a segment of time-varying content;
   score at least two annotations for the segment to each node in an ontology, wherein the score represents how each of the at least two annotations match each node in the ontology;
   identify a sequence of annotations that have a nodal score for the same node that exceeds a minimum threshold score;
   create a semantic segment from the sequence of annotations;
   merge the semantic segment with other semantic segments that satisfy a minimum threshold score;
   sum the scores of the at least two annotations for each node and determine a semantic distance between each node of the ontology for the segment, thereby determining a total score for each node based on the summed score and the semantic distance between each node where the total score is increased based on the semantic distance; and
   classify the segment based on the total score for each node.

2. The device according to claim 1, wherein the processor is further configured to receive metadata associated with each annotation that references at least one of:
   i) an ontological node within the ontology;
   ii) a strength of an association between an annotation and the ontological node; and
   iii) a communications address identifying a location of the ontology.

3. The device according to claim 1, wherein the processor is further configured to compare each score to a minimum threshold score, and classify the segment based on a score greater than or equal to the minimum threshold score.

4. The device according to claim 1, wherein the processor is further configured to calculate a nodal score for each node and compare each nodal score to a minimum threshold score, and classify the segment based on a nodal score greater than or equal to the minimum threshold score.

5. The device according to claim 1, wherein the processor is further configured to calculate a nodal score for each node and modify each nodal score by the semantic distance between at least two nodes.

6. The device according to claim 1, wherein the processor is further configured to calculate a nodal score for each node and collapse at least one lower scoring node into a higher scoring node.

7. The device according to claim 1, wherein the processor is further configured to store the classification in memory.

8. The device according to claim 1, wherein the processor is further configured to compare nodal scores for adjacent annotations.

9. The device according to claim 1, wherein the processor is further configured to exclude an annotation from the sequence that exceeds a threshold time.

10. The device according to claim 1, wherein the relationship between each node of the ontology for the segment includes a nodal distance between each node.

11. A system, comprising:
   a classification application stored in memory; and
   a processor communicating with the memory and with the classification application, the system configured to:
      receive a set of annotations occurring within a segment of time-varying content;
      score at least two annotations for the segment to each node in an ontology, wherein the score represents how each of the at least two annotations match each node in the ontology;
      identify a sequence of annotations that have a nodal score for the same node that exceeds a minimum threshold score;
      create a semantic segment from the sequence of annotations;
      merge the semantic segment with other semantic segments that satisfy a minimum threshold score;
      sum the scores of the at least two annotations for each node and determine a semantic distance between each node of the ontology for the segment, thereby determining a total score for each node based on the summed score and the semantic distance between each node where the total score is increased based on the semantic distance; and
      classify the segment based on the total score for each node.

12. The system according to claim 11, wherein the processor compares each score to a minimum threshold score, and classifies the segment based on a score greater than or equal to the minimum threshold score.

13. The system according to claim 11, wherein the processor is configured to:
   i) calculates a nodal score for each node,
   ii) compares each nodal score to a minimum threshold score, and
   iii) classifies the segment based on a nodal score greater than or equal to the minimum threshold score.

14. The system according to claim 11, wherein the relationship between each node of the ontology for the segment includes a nodal distance between each node.

15. A computer program product comprising a computer-readable medium storing instructions for classifying content segments, the instructions instructing a computer to perform the following steps:
   receive a set of annotations occurring within a segment of time-varying content;
   score at least two annotations for the segment to each node in an ontology, wherein the score represents how each of the at least two annotations match each node in the ontology;
   identify a sequence of annotations that have a nodal score for the same node that exceeds a minimum threshold score;
   create a semantic segment from the sequence of annotations;
   merge the semantic segment with other semantic segments that satisfy a minimum threshold score;
   sum the scores of the at least two annotations for each node and determine a semantic distance between each node of the ontology for the segment, thereby determining a total score for each node based on the summed score and the semantic distance between each node where the total score is increased based on the semantic distance; and
   classify the segment based on the total score for each node.

16. The computer program product according to claim 15, wherein the relationship between each node of the ontology for the segment includes a nodal distance between each node.

* * * * *